United States Patent
Raghunathan et al.

(10) Patent No.: US 10,161,649 B2
(45) Date of Patent: Dec. 25, 2018

(54) OPTIMIZING OPERATIONS OF MULTIPLE AIR-CONDITIONING UNITS

(71) Applicant: Mitsubishi Electric Research Laboratories, Inc., Cambridge, MA (US)

(72) Inventors: Arvind U Raghunathan, Brookline, MA (US); Daniel Nikolaev Nikovski, Brookline, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 1105 days.

(21) Appl. No.: 14/310,274

(22) Filed: Jun. 20, 2014

(65) Prior Publication Data

US 2015/0370271 A1   Dec. 24, 2015

(51) Int. Cl.
*F24F 11/62* (2018.01)
*G05D 23/19* (2006.01)
(Continued)

(52) U.S. Cl.
CPC .......... *F24F 11/62* (2018.01); *B60H 1/00735* (2013.01); *B60H 1/00807* (2013.01); *B60H 1/00814* (2013.01); *B60H 1/00821* (2013.01); *B60H 1/00878* (2013.01); *F24F 11/30* (2018.01); *G05B 15/02* (2013.01);
(Continued)

(58) Field of Classification Search
CPC ............ G06F 17/5004; B60H 1/70035; B60H 1/00807; B60H 1/00814; B60H 1/00821; B60H 1/00878; F24F 11/46; F24F 11/62; F25B 2600/01; F25B 2600/0251; G05B 15/02; G05D 23/00; G05D 23/19; G05D 23/193; G05D 23/1932; Y02T 10/88
USPC .............................................. 703/1
See application file for complete search history.

(56) References Cited

U.S. PATENT DOCUMENTS 9,623,721 B2* 4/2017 Kim .................. B60H 1/00735
2007/0005191 A1  1/2007 Sloup et al.
(Continued)

FOREIGN PATENT DOCUMENTS

IE    20070331 A1   11/2007
WO   WO-2015194387 A1 * 12/2015 .............. F24F 11/30

OTHER PUBLICATIONS

Deng et al. ("Optimal Scheduling of Chiller Plant with Thermal energy Storage using Mixed Integer Linear Programming", 2013 American Control Conference (ACC), Washington, DC, USA, Jun. 17-19, 2013.).*
(Continued)

*Primary Examiner* — Crystal J Barnes-Bullock
(74) *Attorney, Agent, or Firm* — Gene Vinokur; James McAleenan; Hironori Tsukamoto

(57) ABSTRACT

A method operates a set of heating, ventilation and air-conditioning (HVAC) units by optimizing jointly operations of the set of HVAC units subject to constraints to determine times of switching each HVAC unit ON and OFF and by controlling each HVAC unit according to the corresponding times of switching. The operation of each HVAC unit is represented by a continuous function. The constraints include a complementarity constraint for each HVAC unit, such that the complementarity constraint for the HVAC unit defines a discontinuity of the operation of the HVAC unit at corresponding times of switching.

22 Claims, 11 Drawing Sheets

(51) Int. Cl.

| | | |
|---|---|---|
| *F24F 11/30* | (2018.01) | |
| *B60H 1/00* | (2006.01) | |
| *G05B 15/02* | (2006.01) | |
| *F24F 11/54* | (2018.01) | |
| *F24F 11/46* | (2018.01) | |
| *F25B 13/00* | (2006.01) | |
| *F25B 49/02* | (2006.01) | |

(52) U.S. Cl.
CPC ............ *G05D 23/19* (2013.01); *G05D 23/193* (2013.01); *G05D 23/1932* (2013.01); *G05D 23/1934* (2013.01); *F24F 11/46* (2018.01); *F24F 11/54* (2018.01); *F25B 13/00* (2013.01); *F25B 49/022* (2013.01); *F25B 2600/01* (2013.01); *F25B 2600/0251* (2013.01); *Y02T 10/88* (2013.01)

(56) References Cited

U.S. PATENT DOCUMENTS

| | | |
|---|---|---|
| 2011/0209486 A1 | 9/2011 | Burns et al. |
| 2013/0246032 A1* | 9/2013 | El-Bakry ................ E21B 41/00 703/10 |
| 2013/0282181 A1 | 10/2013 | Ning et al. |
| 2015/0057820 A1* | 2/2015 | Kefayati ................ G06Q 50/06 700/291 |
| 2015/0323939 A1* | 11/2015 | Lee ...................... F24F 11/0034 236/46 A |

OTHER PUBLICATIONS

Ma et al. ("A Distributed Predictive Control Approach to Building Temperature Regulation", 2011 American Control Conference on O'Farrell Street, San Francisco, CA, USA, Jun. 29-Jul. 1, 2011).*

Kelman, et al (Parallel Nonlinear Predictive control, Fiftieth Annual Allerton Conference, Allerton House, UIUC, Illinois, USA, Oct. 1-5, 2012).*

Ma et al. ("Fast Stochastic Predictive Control for Building Temperature Regulation", 2012 American Control Conference Fairmont Queen Elizabeth, Montreal, Canada Jun. 27-Jun. 29, 2012).*

Ban et al ("A general MPCC model and its solution algorithm for continuous network design problem", Mathematical and computer modeling, p. 493-505, doi.org/10.1016/j.mcm.2005.11.001).*

* cited by examiner

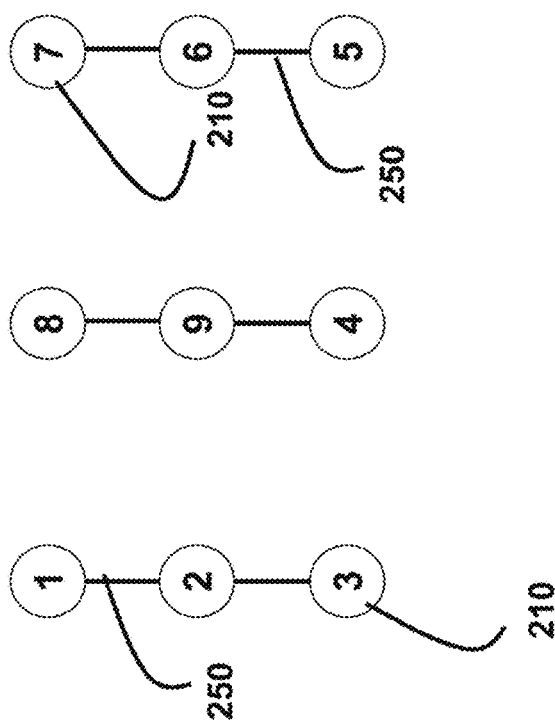

1. Choose $\mu^0 > 0, \varepsilon > 0, l = 0, 0 < \alpha < 1$
2. While ($\mu^l > \varepsilon$) do
   a. Solve optimization problem in Eq. (28) to a tolerance of $\mu^l$
   b. Choose $\mu^{l+1} = \alpha\mu^l$
   c. Set $l = l+1$

Fig. 6

1. Choose $\mu_{i,k}^0 > 0 \forall i = 1,\ldots,nh, k = 1,\ldots,N_T, \varepsilon, \varepsilon^0 > 0, l = 0, 0 < \alpha, \beta < 1$ 2. While $(\|h(y_1^l),\ldots,h(y_{nh}^l)\| > \varepsilon)$ do a. Solve optimization problem in Eq. (29) to a tolerance of $\varepsilon^l$ to obtain solution $(x_k^l, y_k^l, u_k^l, p_k^l) \forall k = 1,\ldots,N_T$ b. For $i=1,\ldots,nh$
      a. If $h_i(y_k^l) > \varepsilon^l$ then
         Choose $\mu_{i,k}^{l+1} = \alpha \mu_{i,k}^l$
      b. else
         Choose $\mu_{i,k}^{l+1} = \mu_{i,k}^l$ a. Set $\varepsilon^{l+1} = \alpha \varepsilon^l$
   b. Set $l = l+1$

Fig. 7

OPTIMIZING OPERATIONS OF MULTIPLE AIR-CONDITIONING UNITS

FIELD OF THE INVENTION

This invention relates generally to heating, ventilating, and air-conditioning (HVAC) systems, and more particularly to optimizing operation, e.g., the energy consumption, of multiple HVAC units.

BACKGROUND OF THE INVENTION

The need for more energy efficient buildings continues to increase. Some methods address this problem by focusing on optimization of heating, ventilating, and air-conditioning (HVAC) units that use a vapor compression cycle to control temperature and/or humidity in a building.

For example, U.S. 2011/0209486 describes an optimization of energy consumption of a single HVAC unit using an extremum seeking control. However, that method does not necessarily lead to the optimization of the operation of multiple HVAC units installed in various parts of the buildings.

The method described in U.S. 2007/0005191 reduces energy consumption by automatically selecting setpoints for operation of multiple HVAC units in different rooms of the building, such that the energy consumption of the entire HVAC system is optimized. However, that method prevents occupants of the building from selecting the setpoints.

SUMMARY OF THE INVENTION

Some embodiments of the invention are based on recognition that an energy efficiency operation of a HVAC system including a set of HVAC units should be addressed by joint optimization of operation of the individual HVAC units.

The operation of each HVAC unit is discrete, i.e., at any given point of time the HVAC unit is either ON or OFF, and discrete models in optimization problems over a finite number of time-steps result in mixed integer optimal control problems (MIOCP), which are difficult to solve.

Some embodiments of the invention are based on a realization that the discrete operation of the HVAC units can be represented by a continuous function subject to complementarity constraints. Such reformulation can be solved by non-linear optimization solvers provided the complementarity constraints are appropriately handled.

In addition, some embodiments are based on another realization that compressors in some building operations are infrequently turned OFF. For instance in an office building, equipment are turned ON prior to occupants coming to work and then, turned OFF after the occupants leave. This realization allows decreasing the number of discrete decisions made by the solvers.

Accordingly, one embodiment discloses a method for operating a set of heating, ventilation and air-conditioning (HVAC) units. The method includes optimizing jointly operations of the set of HVAC units subject to constraints to determine times of switching each HVAC unit ON and OFF, wherein the operation of each HVAC unit is represented by a continuous function, wherein the constraints include a complementarity constraint for each HVAC unit, such that the complementarity constraint for the HVAC unit defines a discontinuity of the operation of the HVAC unit at corresponding times of switching; and controlling each HVAC unit according to the corresponding times of switching. The steps are performed in a processor.

Another embodiment discloses a controller for operating a set of heating, ventilation and air-conditioning (HVAC) units according to corresponding times of switching. The controller includes a processor for optimizing jointly operations of the set of HVAC units subject to constraints to determine times of switching each HVAC unit ON and OFF, wherein the operation of each HVAC unit is represented by a continuous function, wherein the constraints include a complementarity constraint for each HVAC unit, such that the complementarity constraint for the HVAC unit defines a discontinuity of the operation of the HVAC unit at the corresponding times of switching.

BRIEF DESCRIPTION OF THE DRAWING

FIG. 2B is a graphical representation of the rooms with nodes representing rooms, and edges a common wall;

FIG. 6 is a pseudocode of the method for complementarity inequality reformulation according to one embodiment of the invention; and FIG. 7 shows a pseudocode for solving the complementarity inequality with adaptive relaxation according to one embodiment of the invention.

DETAILED DESCRIPTION OF THE PREFERRED EMBODIMENTS

Building Representation

Figure 1:
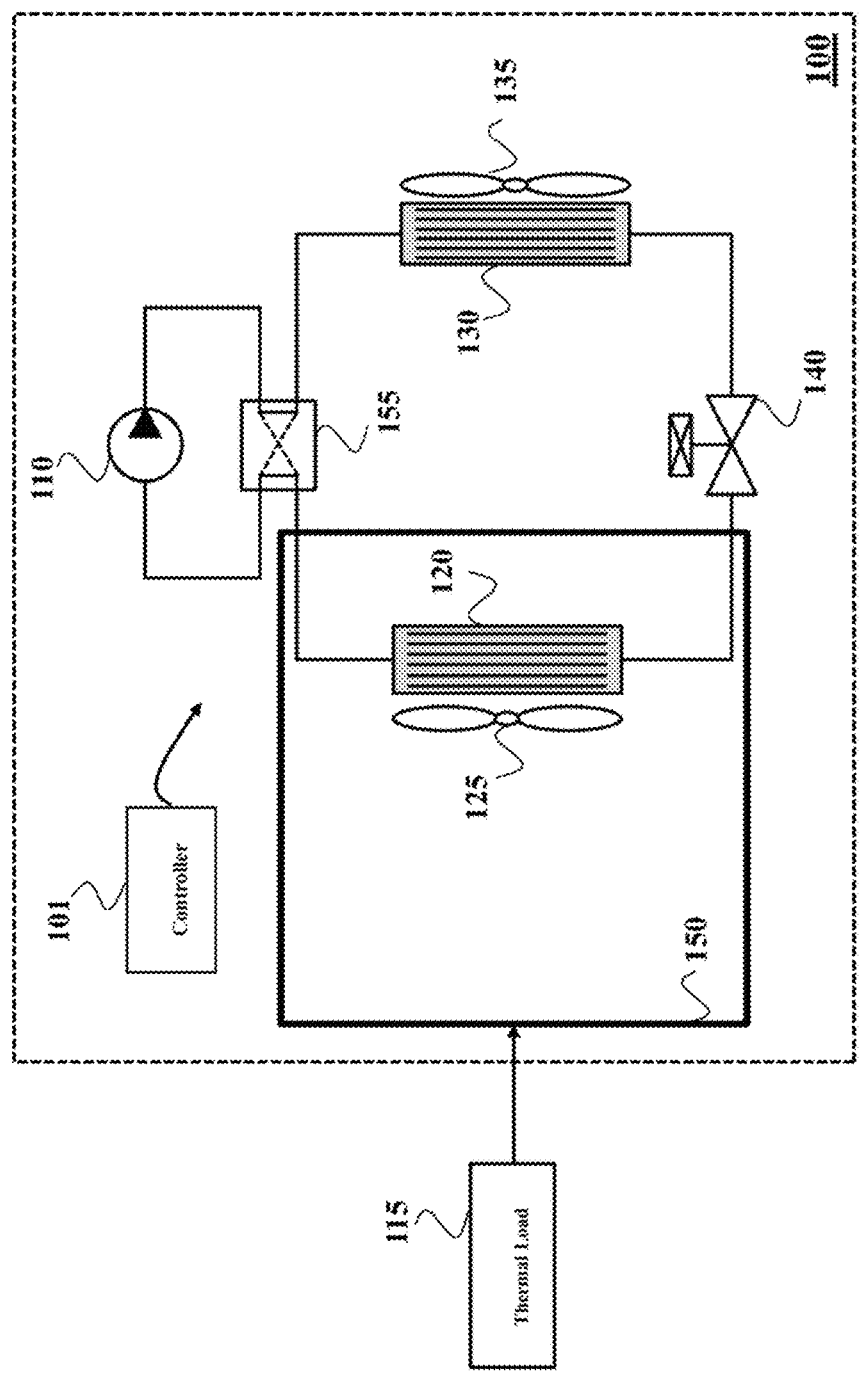
FIG. 1 is a schematic of a heating, ventilating, and air-conditioning (HVAC) unit according to some embodiments of the invention.

FIG. 1 shows a schematic of a heating, ventilating, and air-conditioning (HVAC) unit 100 controlled by a controller 101 according to some embodiments of the invention. The controller 101 determines times of switching an operation of each HVAC unit between ON and OFF states. Thus, the operation of the HVAC unit is discrete, i.e., at any given point of time the HVAC unit is either ON or OFF.

The components of the HVAC unit 100 can include an indoor heat exchanger 120 and a fan 125 located in an indoor zone 150, an outdoor unit heat exchanger 130 and a fan 135, a compressor 110 and an expansion valve 140. A thermal load 115 acts on the indoor zone 150.

Additionally, the HVAC system 100 can include a flow reversing valve 155 that is used to direct high pressure refrigerant exiting the compressor to either the outdoor unit heat exchanger or the indoor unit heat exchanger, and direct low pressure refrigerant returning from either the indoor unit heat exchanger or outdoor unit heat exchanger to the inlet of the compressor. In the case where high pressure refrigerant is directed to the outdoor unit heat exchanger, the outdoor unit heat exchanger acts as a condenser and the indoor unit acts as an evaporator, wherein the system minimizes heat loss to the outdoors, which is operationally referred to as "cooling mode." Conversely, in the case where the high pressure refrigerant is directed to the indoor unit heat exchanger, the indoor unit heat exchanger acts as a condenser and the outdoor unit heat exchanger acts as an evaporator, extracting heat from the outdoors and pumping this heat into the zone, which is operationally referred to as "heating mode."

Usually, buildings include multiple HVAC units 100 arranged in various rooms of a building. Some embodiments of the invention are based on recognition that the energy efficiency of the operation of the HVAC system including a set of HVAC units should be address by joint optimization of operation of the individual HVAC units.

Figure 2A:
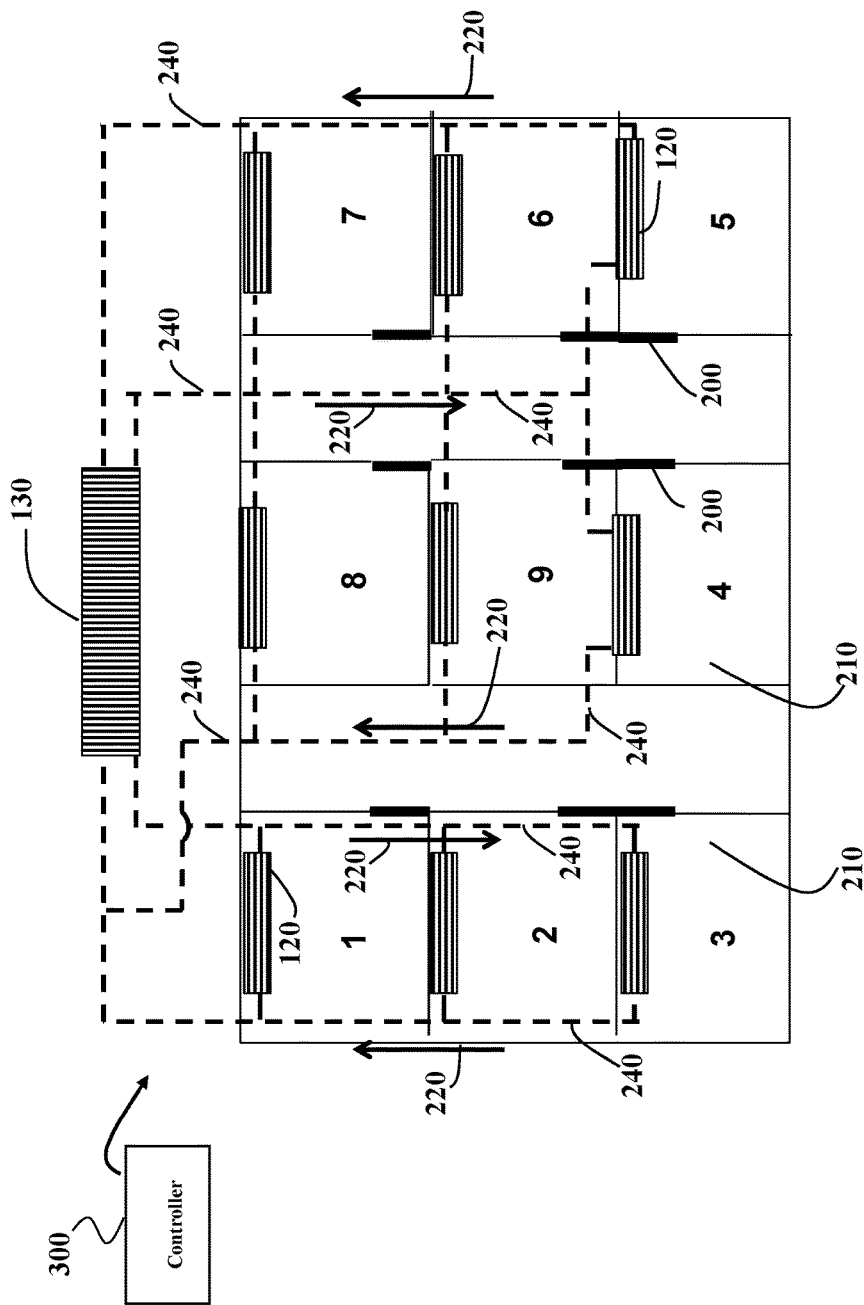
FIG. 2A is an example of a floor plan for a building that can employ the HVAC system having the set of HVAC units according to some embodiments of the invention.

FIG. 2A shows an example of a floor plan for a building that can employ the HVAC system having the set of HVAC units according to some embodiments of the invention. The building includes rooms $\{1, \ldots, 9\}$ 210 and doors 200. Each room is equipped with an indoor air conditioning unit 120. In this example, the indoor units are connected to an outdoor unit heat exchanger 130. A refrigerant is used for cooling or heating room air flows to the indoor units from the outdoor unit. The refrigerant flows (dashed lines) 240 from the indoor unit to the outdoor unit where the heat is dissipated and the refrigerant is recycled back to the indoor unit 240. The controller 300 controls the operation of each HVAC unit between ON and OFF states. For example, the controller 300 can command the operation of the controller 101 of each individual HVAC unit, and/or control the operations of the HVAC units directly.

FIG. 2B shows an example of a graphical representation of the rooms with nodes representing rooms, and edges representing rooms that share a common wall. The representation of nodes 210 corresponds to the numbering of the rooms. The edges 250 represent the walls that are shared by the adjacent rooms.

Room Dynamics Model

Figure 2C:
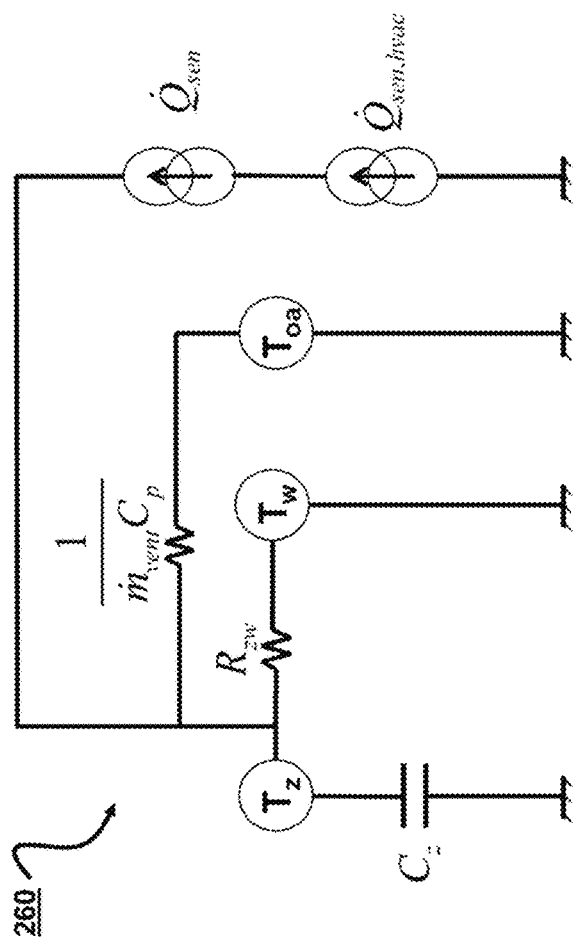
FIG. 2C is a schematic of a resistor-capacitor representation of thermal dynamics of room air.

FIG. 2C shows a resistor-capacitor circuit 260 of the thermal dynamics of room air according to one embodiment of the invention. In this embodiment, the dynamics of the room are modeled as a set of differential equations. The thermal dynamics of the room are modeled as $$\frac{dT_z}{dt} = \frac{T_w - T_z}{C_z R_{zw}} + \frac{\dot{m}_{vent} C_p (T_{oa} - T_z)}{C_z} + \frac{\dot{Q}_{sen}}{C_z} + \frac{\dot{Q}_{sen,hvac}}{C_z}, \quad (1)$$

where $T_z$ is the temperature of the room in degrees centigrade, $T_w$ is the temperature of wall in the room, $C_z$ is the heat capacity of the room air in Joules (J) per kilogram (kg), $R_{zw}$ is the resistance for heat transfer between the zone air and the walls of the zone, $T_{oa}$ is the ambient air temperature, $C_p$ is the specific heat capacity of air in (J/kg/K), $\dot{m}_{vent}$ is the flow rate of ventilation air in (kg/s), $\dot{Q}_{sen}$ is a rate of sensible heat generated by equipment, occupants in the room and solar radiation through windows, $\dot{Q}_{sen,hvac}$ is a rate of sensible heat transferred to the room air from the indoor air conditioning unit. The dot above the variables indicates the first derivative with respect to time.

Figure 2D:
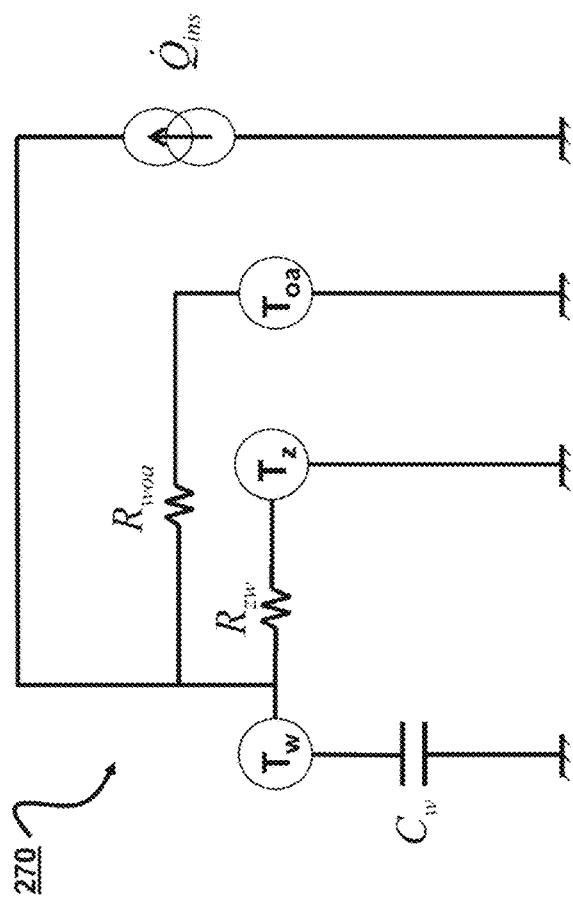
FIG. 2D is a schematic of a resistor-capacitor representation of the thermal dynamics of a wall.

FIG. 2D shows a resistor-capacitor representation 270 of the thermal dynamics of the wall in the room according another embodiment. The thermal dynamics of the wall in the room is modeled as $$\frac{dT_w}{dt} = \frac{T_z - T_w}{C_w R_{zw}} + \frac{T_{oa} - T_w}{C_w R_{woa}} + \frac{\dot{Q}_{ins}}{C_w}, \quad (2)$$

where $C_w$ is the heat capacity of the wall in (J/k), $R_{woa}$ is the resistance for heat transfer between the wall and ambient air and $\dot{Q}_{ins}$ is the rate of heat transfer from solar radiation to the wall in (W).

Figure 2E:
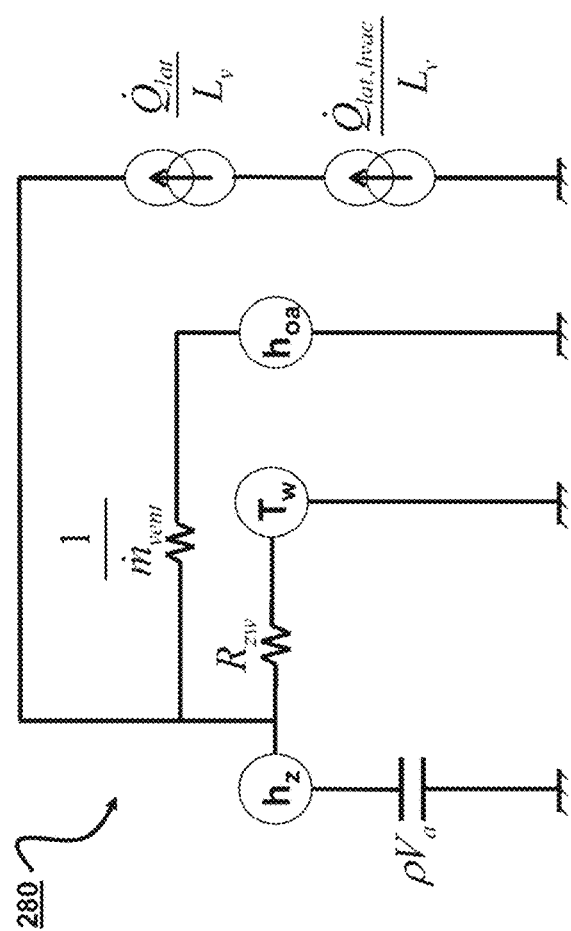
FIG. 2E is a schematic of a resistor-capacitor representation of the humidity dynamics of air.

FIG. 2E shows a resistor-capacitor representation 280 of the humidity dynamics of the room air according another embodiment. The humidity dynamics of the room air is modeled as $$\frac{dh_z}{dt} = \frac{\dot{m}_{vent}(h_{oa} - h_z)}{\rho V_a} + \frac{\dot{Q}_{lat}}{\rho V_a L_v} + \frac{\dot{Q}_{lat,hvac}}{\rho V_a L_v}, \quad (3)$$

where $h_z$ is the specific humidity of zone air in (kg/kg), $\rho$ is the density of air, $V_a$ is the volume of air in the room, $L_v$ is the latent heat of evaporation of water in (J/kg), $\dot{Q}_{lat}$ is the rate of latent heat generated by equipment and occupants in the room in (W) and $\dot{Q}_{lat,hvac}$ is the rate of latent heat added to the room air by the indoor air conditioning unit.

Building Dynamics and Comfort Model

In one embodiment, the dynamical model for a building includes Nz rooms and $N_w$ walls represented as $$\frac{dT_{z,i}}{dt} = \quad (4)$$

$$\sum_{j:j\sim i} \frac{T_{w,j} - T_{z,i}}{C_{z,i} R_{zw,ij}} + \frac{\dot{m}_{vent,i} C_p (T_{oa} - T_{z,i})}{C_{z,i}} + \frac{\dot{Q}_{sen,i}}{C_{z,i}} + \frac{\dot{Q}_{sen,hvac,i}}{C_{z,i}} \forall \, i = 1,$$

$$\ldots, N_z,$$

where the differential variables the subscript i denotes a quantity associated with a room, subscript j denotes a quantity associated with a wall, subscript ij denotes a quantity associated with room i and wall j and notation j:i~j denotes the set of (i,j) that such that room i has wall j. In the above, $T_{z,i}$ represent the air temperature in room i, $T_{w,j}$ represents the temperature of wall j, $\dot{Q}_{sen,i}$ represents the rate of sensible heat generation from equipment, occupants and solar radiation through windows, $\dot{Q}_{sen,hvac}$ represent the rate of sensible heating delivered by the air conditioner in room i, $\dot{m}_{vent,i}$ is the ventilation air flow rate from room i, $C_{z,i}$ is the heat capacity of air in room i and $R_{zw,ij}$ is the resistance for heat transfer between air in room i and wall j.

The thermal dynamics of the wall in the building are represented as $$\frac{dT_{w,j}}{dt} = \sum_{i:j\sim i} \frac{T_{z,i} - T_{w,j}}{C_{w,j} R_{zw,ij}} + \frac{T_{oa} - T_{w,j}}{C_{w,j} R_{woa,j}} + \frac{\dot{Q}_{ins,j}}{C_{w,j}} \forall \, j = 1, \ldots, N_w, \quad (4)$$

where $C_{w,j}$ represents the heat capacity of wall j, $R_{woa,j}$ represents the resistance for heat transfer between the wall j and the outside air, $\dot{Q}_{ins,j}$ is the rate of heat gain on wall j from solar radiation, and notation i:i~j denotes the set of (i,j) that such that room i has wall j.

The humidity dynamics of the rooms in the building are represented as $$\frac{dh_{z,i}}{dt} = \frac{\dot{m}_{vent,i}(h_{oa} - h_{z,i})}{\rho V_{a,i}} + \frac{\dot{Q}_{lat,i}}{\rho V_{a,i} L_v} + \frac{\dot{Q}_{lat,hvac,i}}{\rho V_{a,i} L_v} \forall i = 1, \ldots, N_z, \quad (6)$$

where $h_{z,i}$ is the humidity of the air in room i, $V_{a,i}$ is the volume of air in room i, $\dot{Q}_{lat,i}$ is the rate of heat generated by equipment, occupants in room i, and $\dot{Q}_{lat,hvac,i}$ is the rate of latent heat delivered by the air conditioner in room i.

The comfort model for all rooms in the building is represented as $$T_{z,i}^l \leq T_{z,i} \leq T_{z,i}^u, \quad (7)$$

$$h_{z,i}^l \leq h_{z,i} \leq h_{z,i}^u. \quad (8)$$

where $T_{z,i}^l$ is the lower limit on the temperature in room i, $T_{z,i}^u$ is the upper limit on the temperature in room i, $h_{z,i}^l$ is the lower limit on the humidity in room i, and $h_{z,i}^u$ is the lower limit on the humidity in room i.

HVAC Outdoor and Indoor Unit

In the preferred embodiment, the outdoor and indoor units are modeled as $$P_{hvac} = \begin{cases} a_0 + a_1 * T_{oa} + a_2 * Cf & \text{when unit of on} \\ 0 & \text{when unit is off} \end{cases} \quad (9)$$

$$\dot{Q}_{all,hvac} = \begin{cases} b_0 + b_1 * T_{oa} + b_2 * Cf & \text{when unit is on} \\ 0 & \text{when unit is off} \end{cases}$$

where, $P_{hvac}$ is the amount of electric power consumed by the HVAC outdoor unit, $\dot{Q}_{all,hvac}$ is the total heating delivered by the HVAC unit, $C_f$ is the compressor frequency of the HVAC unit, $a_0, a_1, a_2, b_0, b_1, b_2$ are constants. Further, $$X_{cond} = \frac{\Delta X}{\Delta H} \dot{Q}_{all,hvac} \quad (10)$$

$$\Delta X = \frac{\sum_{i=1}^{N_z} \dot{m}_{hvac,i} h_{z,i} - \sum_{i=1}^{N_z} \dot{m}_{hvac,i} h_{out}}{\sum_{i=1}^{N_z} \dot{m}_{hvac,i}}$$

$$RH_{out} = \frac{h_{out}}{0.622 + h_{out}}$$

$$\Delta H = \sum_{i=1}^{N_z} \dot{m}_{hvac,i} H_{z,i} - \sum_{i=1}^{N_z} \dot{m}_{hvac,i} H_{z,out}$$

$$H_{z,i} = C_p T_{z,i} + h_{z,i}(C_{pw} T_{z,i} + L_v)$$

$$H_{z,out} = C_p T_{z,i} + h_{z,out}(C_{pw} T_{out} + L_v)$$

$$T_{out} = (1 - BPF) * T_{cond} + \frac{\sum_{i=1}^{N_z} \dot{m}_{hvac,i} T_{z,i}}{\sum_{i=1}^{N_z} \dot{m}_{hvac,i}}$$

$$\dot{Q}_{sen,hvac,i} = \dot{m}_{hvac,i} C_p T_{out} \forall i = 1, \ldots, N_z$$

$$\dot{Q}_{lat,hvac,i} = \dot{m}_{hvac,i} h_{out}(C_p T_{out} + L_v) \forall i = 1, \ldots, N_z,$$

where $X_{cond}$ is the amount of condensation in the outdoor unit, $\Delta X$ is the difference in specific humidity between the inlet and outlet of the outdoor unit, $\dot{m}_{hvac,i}$ is the mass flow rate of air from the room air conditioners, $h_{out}$ is the specific humidity of air at outlet of outdoor unit, $RH_{out}$ is the relative humidity of air at outlet of outdoor unit, $\Delta H$ is the difference in specific enthalpy between the inlet and outlet of the outdoor unit, $H_{z,i}$ is the specific enthalpy of the return air from the air conditioner in room i, $H_{out}$ is the specific enthalpy of the air supplied by the outdoor unit to the rooms, BPF is the bypass factor of the outdoor unit, $T_{cond}$ is the condensation temperature at the outdoor unit.

Typically, $RH_{out}$ is selected to 95%, BPF is selected to 0.2 and $T_{cond}$ is selected to 5 deg C.

The model in Eq. (9)-(10) applies for a single outdoor unit, and can be extended to the case of multiple outdoor units.

Modeling HVAC ON/OFF Operation Using Discrete Variables

Some embodiments of the invention are based on recognition that the operation of the HVAC unit is discrete, i.e., at any given point of time the HVAC unit is either ON or OFF, and discrete models in optimization problems over a finite number of time-steps result in mixed integer optimal control problems (MIOCP). MIOCPs are computationally difficult to solve even when a single time-step is used in the optimization, because the solution falls in the class of mixed integer nonlinear programs (MINLP). When multiple time-steps are used, the number of discrete decision variables grows linearly and such optimization problem quickly becomes computationally intractable.

For example, as given in equation (9), power $P_{hvac}(t)$ consumed by the HVAC unit and the total heating $\dot{Q}_{all,hvac}(t)$ delivered by the HVAC unit at time t are described by a conditional model of the form $$P_{hvac}(t) = \begin{cases} P_{hvac,fix} + P_{hvac,var}(T_{oa}(t), C_f(t)) & \text{when unit of on} \\ 0 & \text{when unit is off} \end{cases} \quad (11)$$

$$\dot{Q}_{all,hvac}(t) =$$

$$\begin{cases} \dot{Q}_{all,hvac,fix} + \dot{Q}_{all,hvac,var}(T_{oa}(t), C_f(t)) & \text{when unit of on} \\ 0 & \text{when unit is off} \end{cases},$$

where $P_{hvac,fix}$ is the fixed amount of power used by the HVAC unit, $\dot{Q}_{all,hvac,fix}$ is the fixed amount of heating delivered by the HVAC unit, $P_{hvac,var}$ is the variable amount of power that is used by the HVAC unit, $\dot{Q}_{all,hvac,var}$ is the variable amount of heating that is delivered by the HVAC unit and are a function depending on $T_{oa}(t)$ the outside air temperature and a frequency $C_f(t)$ of the compressor of the HVAC unit at time t.

The discrete model for systems uses a discrete variable $z(t) \in \{0,1\}$ where $z(t)=0$ represents a ON unit, and $z(t)=1$ represents an OFF unit. Using this discrete variable the conditional model of equation (1) can be written, $$P_{hvac}(t) = z(t)(P_{hvac,fix} + P_{hvac,var}(T_{oa}(t), C_f(t)))$$

$$\dot{Q}_{all,hvac}(t) = z(t)(\dot{Q}_{all,hvac,fix} + \dot{Q}_{all,hvac,var}(T_{oa}(t), C_f(t)))$$

$$z(t) \in \{0,1\} \quad (12)$$

In Equation (2), $P_{hvac}(t) = \dot{Q}_{all,hvac}(t) = 0$ when $z(t)=0$ and $P_{hvac}(t) = P_{hvac,fix} + P_{hvac,var}(T_{oa}(t), C_f(t))$, $\dot{Q}_{all,hvac}(t) = \dot{Q}_{all,hvac,fix} + \dot{Q}_{all,hvac,var}(T_{oa}(t), C_f(t))$ when $z(t)=1$.

Thus, the Equation (12) exactly models the operation of the HVAC system. However, using Equation (12) in an optimization problem over a finite number of time-steps results in the optimization problem being in the class of the MIOCP, which is difficult to solve.

Modeling ON/OFF Operation Using Complementarity Constraints

Some embodiments of the invention are based on a realization that the discrete nature of the operation of the HVAC units can be represented by a continuous function subject to the complementarity constraints. Such reformulation enables the use of various non-linear optimization solvers provided the complementarity constraints are appropriately handled.

In addition, some embodiments are based on another realization that, typically, in the building, the HVAC units are turned off very few times in a single day. For instance in an office building, equipment are turned ON prior to occupants coming to work and then, turned OFF after the occupants leave. For example, in some embodiments, the period of time for which the complementarity constraints are defined is twenty four hours. Thus, the number of discrete decisions can be significantly reduced critically reducing the search space.

The complementarity constraint is defined as, $$a \geq 0 \perp b \geq 0$$

which is equivalent to the following set of conditions, $$a,b \geq 0, ab=0$$

This complementarity condition enforces that only value of only one parameter a or b can be non-zero at any feasible point. In other words, at any feasible point either a=0 or b=0.

For example in one embodiment, the complementarity constraint for the HVAC unit includes $$z_1(t) \geq 0 \perp \lambda_1(t) \geq 0$$

$$z_1(1) \leq 1 \perp v_1(t) \geq 0, \quad (13)$$

wherein a variable $z_1(t)$ models a state of the HVAC unit and is one after the HVAC unit is switched ON at the switch ON time and is zero before the switch ON time, and $\lambda_1(t)$, $v_1(t)$ are multipliers for the lower bound $z_1(t) \geq 0$ and upper bound $z_1(t) \leq 1$ constraints respectively The complementarity constraint for the HVAC unit can also include $$z_2(t) \geq 0 \perp \lambda_2(t) \geq 0$$

$$z_2(t) \leq 1 \perp v_2(t) \geq 0, \quad (14)$$

wherein a variable $z_2(t)$ models the state of the HVAC unit and equals one after the HVAC unit is switched OFF at the switch OFF time and equals zero before the switch OFF time, and $\lambda_2(t)$, $v_2(t)$ are Lagrange multipliers for the lower bound $z_2(t) \geq 0$ and upper bound $z_2(t) \leq 1$ In this embodiment, the continuous function includes $$-(t-\tau_1)-\lambda_1(t)+v_1(t)=0, \text{ and}$$

$$-(t-\tau_2)-\lambda_2(t)+v_2(t)=0, \quad (15)$$

wherein $\tau_1$ is a switch ON time of switching a HVAC unit ON, and $\tau_2$ is a switch OFF time of switching the HVAC unit OFF.

For example, if $\lambda_1(t), v_1(t) > 0$, then the complementarity constraints in Equation (13) provide that $z_1(t)=0$, $z_1(t)=1$ should hold simultaneously. Since this is not possible this condition cannot occur.

On the other hand, if $t<\tau_1, \lambda_1(t)=(\tau_1-t), v_1(t)=0$ then the complementarity conditions in Equation (13) imply that $z_1(t)=0$. Similarly, if $t>\tau_1$, $\lambda_1=0$, $v_1=(t-\tau_1)$, then the complementarity conditions in Equation (13) provide that $z_1(t)=1$.

Thus, according to the complementarity constraint of the Equation (13)

$$z_1(t) = \begin{cases} 0 \text{ if } t < \tau_1 \\ \text{number } b/w \ 0, 1 \text{ if } t = \tau_1 \\ 1 \text{ if } t > \tau_1 \end{cases} \quad (16)$$

Because, $z_1(t)=1$ for $t>\tau_1$, the complementarity constraint of the Equation (13) describes the times of switching the HVAC units ON. In the similar manner, the complementarity constraint of the Equation (14) describes the times of switching the HVAC units OFF. Specifically $$z_2(t) = \begin{cases} 0 \text{ if } t < \tau_2 \\ \text{number } b/w \ 0, 1 \text{ if } t = \tau_2 \\ 1 \text{ if } t > \tau_2 \end{cases} \quad (17)$$

Accordingly, in some embodiments, the continuous function includes $$z(t)=z_1(t)-z_2(t), \quad (18)$$

wherein z(t) is a variable that equals one when the state of the HVAC unit is ON and equals zero when the state of the HVAC unit is OFF. The complementarity constraints can be solved using nonlinear programming solvers which are computationally faster than MINLP solvers.

In addition to the complementarity constraints, constraints of the form $$z_1(t) \geq z_2(t) \quad (19)$$

can be included to avoid numerical round off issues.

For example in one embodiment, the complementarity constraint for the HVAC unit includes $$z(t) \geq 0 \perp \lambda(t) \geq 0$$

$$z(t) \leq 1 \perp v(t) \geq 0, \quad (20)$$

wherein a variable z(t) is a variable that equals one when the state of the HVAC unit is ON and equals zero when the state of the HVAC unit is OFF, and $\lambda(t)$, $v(t)$ are multipliers for the lower bound $z(t) \geq 0$ and upper bound $z(t) \leq 1$ constraints respectively In this embodiment, the continuous function includes $$-(t-\tau_1)(\tau_2-t)-\lambda(t)+v(t)=0 \quad (21)$$

wherein $\tau_1$ is a switch ON time of switching a HVAC unit ON, $\tau_2$ is a switch OFF time of switching the HVAC unit OFF.

Modeling Multiple HVAC Units Using Complementarity Constraints

Some embodiments of the invention are based on the realization that when there are multiple HVAC units and the thermal load in the building is much lower than the combined heating capacity of the HVAC units then, there exist multiple operational combinations of the HVAC units that can still satisfy the loads. This implies that the nonlinear optimization formulation has multiple solutions with identical operating costs. The existence of multiple solutions adversely affects the performance of nonlinear programming solver.

For example, in one embodiment, when there are Nh HVAC units present then, the time of switching ON of the HVAC units can be sequenced using the constraints $$\left.\begin{array}{l}\tau_{1,i} \leq \tau_{1,i+1}\\ \tau_{2,i} \geq \tau_{2,i+1}\end{array}\right\} \forall\, i=1,\ldots,Nh-1. \quad (22).$$

This constraint ensures that HVAC unit i is switched ON before the unit i+1 and also that HVAC unit i+1 is switched OFF before the unit i. The equation (22) specify a method of operation whereby, the HVAC unit i+1 cannot operate for a longer time period than unit i.

Optimization Formulation

Figure 3:
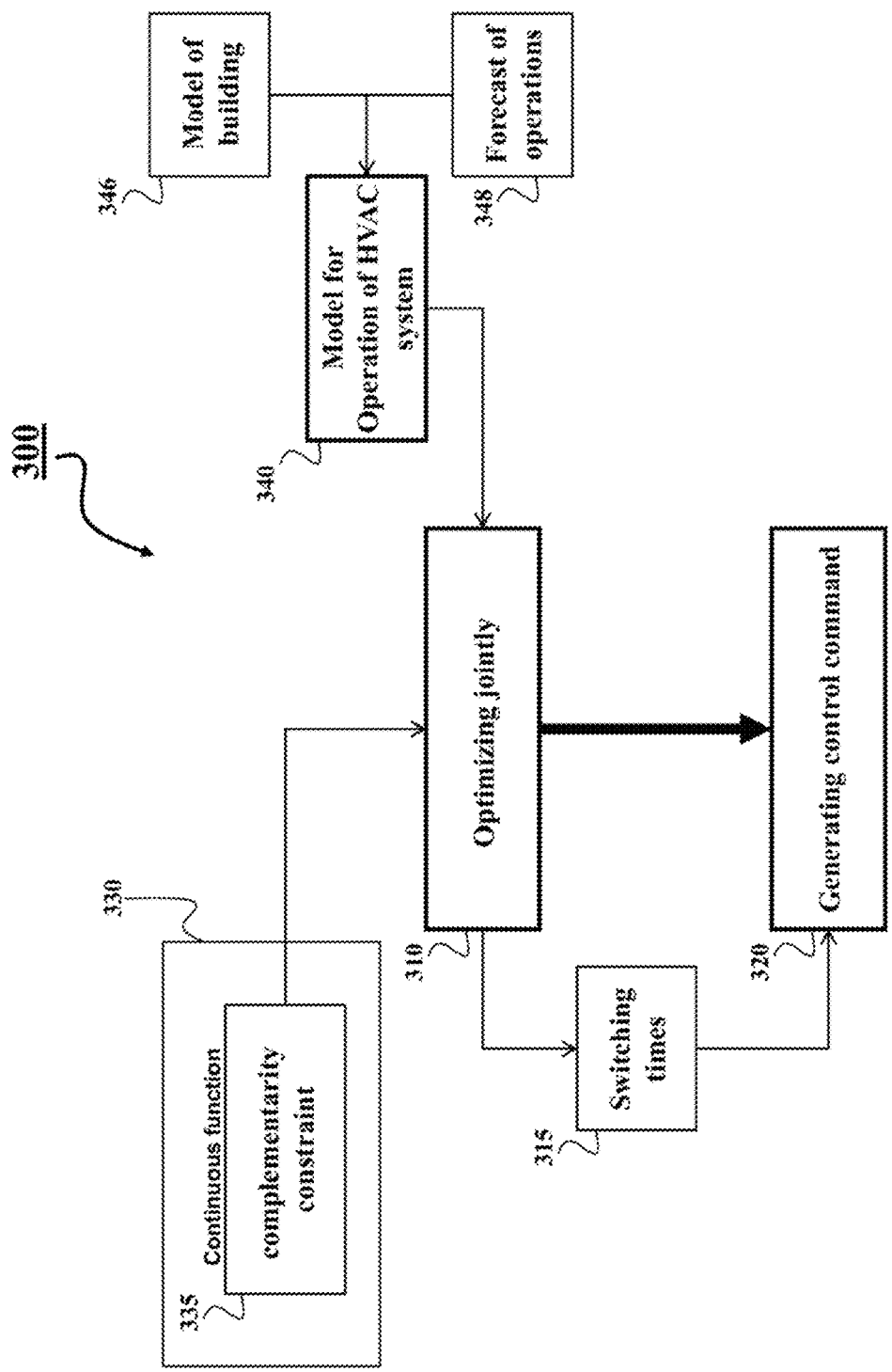
FIG. 3 is a block diagram of a method used for optimizing energy consumption of the HVAC system including the set of HVAC units according to some embodiments.

FIG. 3 shows a block diagram of a method used by the controller 300 for optimizing energy consumption of the HVAC system including a set of HVAC units according to some embodiments. The method optimizes 310 jointly operations of the HVAC units subject to constraints to determine times of switching 315 each HVAC unit ON and OFF, and controls 320 each HVAC unit according to the corresponding times of switching. The method can be performed by a processor, such as a processor of the controller 300.

The joint optimization is performed subject to constraints. During the joint optimization, the operation of each HVAC unit is represented by a continuous function 330, wherein the constraints include a complementarity constraint 335 for each HVAC unit. The complementarity constraint for a HVAC unit defines a discontinuity of the operation of the HVAC unit at corresponding times of switching. For example, the complementarity constraint defines that the operation of HVAC unit includes one switching from OFF to ON state and one switching from ON to OFF state within a period of time. The usage of complementarity constraint enables the possibility of using the continuous function 330 as contrasted with discrete functions of the MIOCP.

In some embodiments, the joint optimization is performed according to a model 340 of the operation of the HVAC system. For example, the model can be performed using a model 346 of the building, e.g., a model exemplified on FIG. 2. In addition, some embodiments determine the model for the operation of the HVAC system for a period of time using a forecast 348 of the operation of the HVAC system. Furthermore, some embodiments of the invention are also based on a recognition that comfort of the occupants needs to be considered in the optimization of the performance of the HVAC system. For example, in some embodiments, parameters of optimization include one or combination of a comfort of occupants in the building and the energy consumption of the HVAC system.

Figure 4:
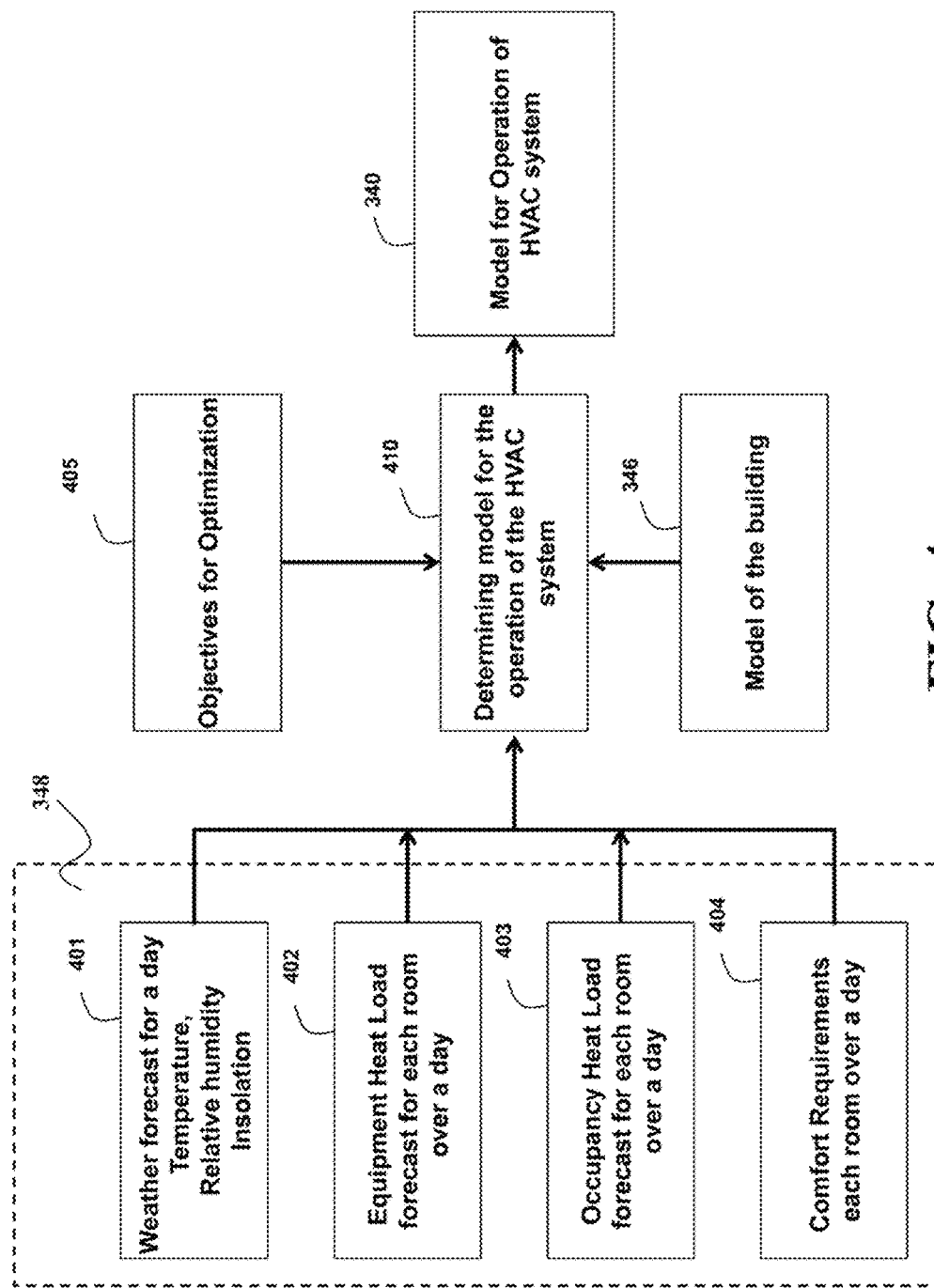
FIG. 4 is a block diagram of a method for determining the model of the operation of the HVAC system according to one embodiment of the invention.

FIG. 4 shows a schematic of a method for determining the model 340 of the operation of the HVAC system according to one embodiment of the invention. In this embodiment, the forecast of the operation 348 includes one or combination of a weather forecast 401 for the period of time, a heat load forecast 402 for each HVAC unit for the period of time, an occupancy heat load forecast 403 for each room for the period of time, and comfort requirements 404 for each room for the period of time. The forecast of the operation 348 is inputted into determining the model for the operation of the HVAC system 410.

The embodiment can also consider objective of optimization 405 that can include one or combination of a comfort of occupants in the building described by an occupant comfort metric, such as a predicted mean vote (PMV), or thermal comfort zones during the determination of the operational strategies. Wherein the objectives for optimization 405 and the model of the building 346 are inputted into determining the model for the operation of the HVAC system 410.

Figure 5:
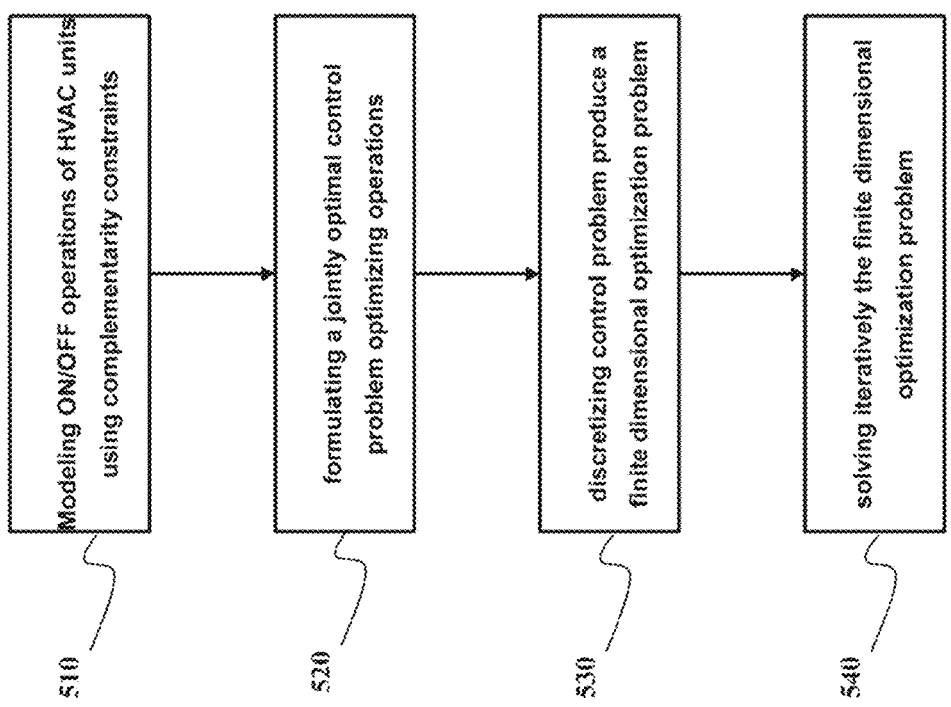
FIG. 5 is a flow chart of a method for joint optimization according to one embodiment of the invention.

FIG. 5 shows a flow chart of a method implementing of the joint optimization 310 according to one embodiment. The method includes modeling 510 the ON/OFF operations of the HVAC units using the complementarity constraints and formulating 520 an optimal control problem jointly optimizing the ON/OFF operations of the HVAC units. The method further includes discretizing 530 the optimal control problem using an integration technique to produce a finite dimensional optimization problem and solving 540 iteratively the finite dimensional optimization problem using a sparse linear algebra until a convergence condition is met. The use of sparse linear algebra is based on the realization that layout of the rooms in buildings are such that each room typically shares a room with typically 3 or fewer other rooms. As a consequence, the model of the building does not couple the temperature, humidity in a room with temperature, humidity in every other room. Thus, the building model is sparse and the use of sparse linear algebra tremendously reduces the computational time involved in solution of the optimization problem.

In one embodiment, the optimization minimizes the electric power consumption of the outdoor unit as, $$\min \int_0^T P_{hvac}\, dt \quad (23)$$

Eq. (4)-(8), $\forall\, i = 1, \ldots, N_z$ }

Eq. (10), (13)-(19), (22)

s.t. $\forall\, t \in [0, T]$

Initial condition for room temperatures, humidity and wall temperatures $\left.\begin{array}{l}\text{Bounds on } Cf, \dot{m}_{hvac,i}\\ \text{Physical bounds on variables}\end{array}\right\} \forall\, t \in [0, T]$.

In Eq. (23), the complementarity formulation as in (13)-(14) is used to model the conditional statements in the modeling of the HVAC units. The compressor frequency is limited to be within 10 Hz~80 Hz, and the mass flow rates are also limited based on the capacity of the fans in the individual air conditioning units. In addition, limits such as non-negativity of temperatures, humidity and other quantities from physical considerations are included in the optimization formulation.

There are a number of parameters whose values for the period of the optimization are provided. These parameters are:

$$\dot{Q}_{ins,1},\ldots,\dot{Q}_{ins,N_w},T_{oa},h_{oa},\dot{Q}_{sen,occ,1},$$
$$\dot{Q}_{lat,occ,1},\ldots,\dot{Q}_{N_z},\dot{Q}_{lat,occ,N_z}.$$

For simplicity of this description, the building dynamics model is represented as $$\left.\begin{array}{l}\dfrac{dx}{dt}=f^{diff}(x(t),y(t),u(t),p,d(t))\\ f^{alg}(x(t),y(t),t(t),p,d(t))=0\end{array}\right\} \forall\, t \in [0, T] \quad (24)$$

$(x(0), y(0)) = (\hat{x}, \hat{y})$, where x the set of differential variables corresponds to $$(T_{z,1},h_{z,1},\ldots,T_{z,N_z},h_{z,N_z},T_{w,1},\ldots,T_{w,N_w}),y$$

the set of algebraic variables corresponds to $$H_{z,1}, \dot{Q}_{sen,hvac,1}, \dot{Q}_{lat,hvac,1}, \ldots, H_{z,N_z}, \dot{Q}_{sen,hvac,N_z},$$
$$\dot{Q}_{lat,hvac,N_z}, X_{cond}, \Delta X, RH_{out}, H_{z,out}, T_{out}$$

$$H_{z,1}, \dot{Q}_{sen,hvac,1}, \dot{Q}_{lat,hvac,1}, \ldots, H_{z,N_z}, \dot{Q}_{sen,hvac,N_z},$$
$$\dot{Q}_{lat,hvac,N_z}, X_{cond}, \Delta X, RH_{out}, H_{z,out}, T_{out}$$

$$z_{1,1}, z_{2,1}, \ldots, z_{1,Nh}, z_{2,Nh}, \lambda_{1,1}, \lambda_{2,1}, \ldots, \lambda_{1,Nh}, \lambda_{2,Nh},$$
$$\nu_{1,1}, \nu_{2,1}, \ldots, \nu_{1,Nh}, \nu_{2,Nh}$$

u the set of control variables corresponds to $$(Cf, \dot{m}_{hvac,1}, \ldots, \dot{m}_{hvac,N_z}),$$

p the set of time invariant parameters corresponds to $$\tau_{1,1}, \tau_{2,1}, \ldots, \tau_{1,Nh}, \tau_{2,Nh}$$

and d the set of time dependent parameters $$\dot{Q}_{ins,1}, \ldots, \dot{Q}_{ins,N_w}, T_{oa}, h_{oa}, \dot{Q}_{sen,occ,1},$$
$$\dot{Q}_{lat,occ,1}, \ldots, \dot{Q}_{N_z}, \dot{Q}_{lat,occ,N_z}.$$

The differential equations correspond to Equations (4)-(6). The algebraic equations correspond to Equations (10), (13)-(19), (22). With this representation, the optimization problem in Eq. (23) can be recast as $$\min \int_0^T c(x, y, u) \, dt \qquad (25)$$

$$\text{s.t.} \quad \begin{aligned} \frac{dx}{dt} &= f^{diff}(x(t), y(t), u(t), d(t)) \\ f^{alg}(x(t), y(t), u(t), d(t)) &= 0 \end{aligned} \Bigg\} \forall t \in [0, T]$$

$$(x(0), y(0)) = (\hat{x}, \hat{y})$$

$$\begin{aligned} g(x(t), y(t), u(t), p) &\leq 0 \\ h(y(t)) &\leq 0 \\ \underline{x}(t) \leq x(t) &\leq \overline{x}(t) \\ \underline{y}(t) \leq y(t) &\leq \overline{y}(t) \\ \underline{u}(t) \leq u(t) &\leq \overline{u}(t) \end{aligned} \Bigg\} \forall t \in [0, T],$$

where $\underline{x}, \overline{x}$ are lower and upper limits on differential variables, $\underline{y}, \overline{y}$ are lower and upper limits on algebraic variables and $\underline{u}, \overline{u}$ are lower and upper limits on the controls. The limits are assumed to be function of time because different bounds can be specified based on the occupancy conditions. The function g represents the inequality constraints in Equations (18),(22) and the function $h(y(t)) \leq 0$ represents the complementarity constraints in Equations (13)-(14) formulated as inequality constraints as follows, $$\begin{aligned} z_{1,i}(t) \lambda_{1,i}(t) &\leq 0 \\ (1 - z_{1,i}(t)) \nu_{1,i}(t) &\leq 0 \\ z_{2,i}(t) \lambda_{2,i}(t) &\leq 0 \\ (1 - z_{2,i}(t)) \nu_{2,i}(t) &\leq 0 \end{aligned} \Bigg\} \forall i = 1, \ldots, Nh, t \in [0, T]$$

The optimization problem in Eq. (25) is an instance of an optimal control problem. These problems are generally be solved by discretizing the differential and algebraic equations, which are now imposed at a finite set of time instances instead of all time instants in [0,T].

Discretization schemes, such as the explicit Euler, implicit Euler, Runge-Kutta methods, or colocation schemes can be used. With such a discretization, the problem in Eq. (25) is reduced to a nonlinear program with finite number of variables and constraints.

In the preferred embodiment, the optimal control problem is Eq. (25) is discretized using an implicit Euler scheme as $$\min \Delta t \sum_{k=1}^{N_T} c(x_k, y_k, u_k) \qquad (26)$$

$$\text{s.t.} \quad \frac{x_k - x_{k-1}}{\Delta t} = f^{diff}(x_k, y_k, u_k, d_k) \forall k = 1, \ldots, N_T$$

$$0 = f^{alg}(x_k, y_k, u_k, d_k) \forall k = 1, \ldots, N_T$$

$$(x_0, y_0) = (\hat{x}, \hat{y})$$

$$g(x_k, y_k, u_k, p) \leq 0 \forall k = 1, \ldots, N_T$$

$$h(y_k) \leq 0$$

$$\underline{x}_k \leq x_k \leq \overline{x}_k$$

$$\underline{y}_k \leq y_k \leq \overline{y}_k$$

$$\underline{u}_k \leq u_k \leq \overline{u}_k,$$

where $\Delta t$ is the time step of the discretization and $N_T = T/\Delta t$ are the number of discretization steps in the optimization. The optimization problem in Eq. (26) is very sparse and appropriate use of spare linear algebra can reduce the computational complexity.

In the preferred embodiment, the optimization problem in (24) is solved using nonlinear programming algorithms that use sparse linear algebra techniques.

In another embodiment the ON/OFF operation of the HVAC units is modeled using the complementarity conditions in conditional equations in PMV calculation is formulated using complementarity constraints in (20) and the continuous function in (21). The resulting optimization formulation is $$\min \int_0^T P_{hvac} \, dt \qquad (27)$$

$$\left. \begin{aligned} &\text{Eq. (4)-(8)}, \forall i = 1, \ldots, N_z \\ &\text{Eq. (10), (20)-(22)} \end{aligned} \right\}$$

s.t. $\forall t \in [0, T]$

Initial condition for room temperatures, humidity and wall temperatures $$\left. \begin{aligned} &\text{Bounds on } Cf, \dot{m}_{hvac,i} \\ &\text{Physical bounds on variables} \end{aligned} \right\} \forall t \in [0, T]$$

The optimization problem in (27) can be similarly cast in the form of the problem in (25) wherein the algebraic variables correspond to $$H_{z,1}, \dot{Q}_{sen,hvac,1}, \dot{Q}_{lat,hvac,1}, \ldots, H_{z,N_z}, \dot{Q}_{sen,hvac,N_z},$$
$$\dot{Q}_{lat,hvac,N_z}, X_{cond}, \Delta X, RH_{out}, H_{z,out}, T_{out}$$

$$z_1, z_{Nh}, \lambda_1, \ldots, \lambda_{Nh}, \nu_1, \ldots, \nu_{Nh},$$

and the inequality constraints g represents the inequality constraints in Equations (22) and the function $h(y(t)) \leq 0$ represents the complementarity constraints in Equation (20) formulated as inequality constraints as follows, $$z(t)\lambda(t) \leq 0$$

$$(1-z(t))\nu(t) \leq 0$$

The optimization problem in (27) can be discretized to obtain a nonlinear program similar to that in equation (26), to which nonlinear programming algorithms can be applied.

Solving the Discretized Optimal Control Problem

The optimization problem in Eq. (26) constitutes a generic nonlinear programming problem. However, the constraints h(y(t))≤0 which are derived from the complementarity constraints in Eq. (13)-(14) or Eq. (20). Such constraints result in the violation of commonly assumed regularity conditions for nonlinear programming algorithms such as interior point methods.

In one embodiment of the invention, the inequality constraints is relaxed using a parameter µ>0 as, $$h(y(t)) \leq \mu.$$

The relaxed optimization problem is now given by, $$\min \Delta t \sum_{k=1}^{N_T} c(x_k, y_k, u_k) \quad (28)$$

$$\text{s.t.} \quad \frac{x_k - x_{k-1}}{\Delta t} = f^{diff}(x_k, y_k, u_k, d_k) \forall\, k = 1, \ldots, N_T$$

$$0 = f^{alg}(x_k, y_k, u_k, d_k) \forall\, k = 1, \ldots, N_T$$

$$(x_0, y_0) = (\hat{x}, \hat{y})$$

$$g(x_k, y_k, u_k, p) \leq 0 \} \forall\, k = 1, \ldots, N_T$$

$$h(y_k) \leq \mu$$

$$\underline{x}_k \leq x_k \leq \overline{x}_k$$

$$\underline{y}_k \leq y_k \leq \overline{y}_k$$

$$\underline{u}_k \leq u_k \leq \overline{u}_k$$

As shown in FIG. 6, the relaxed version of the problem is solved, parameter µ>0 is further reduced, and the procedure is repeated.

Another embodiment of the invention uses multiple parameters $\mu_i \forall i=1, \ldots, nh$, where each of the parameters is used to individually relax each of the inequality constraints as $$h_i(y(t)) \leq \mu_i(t) \forall i=1, \ldots, nh$$

The relaxed optimization problem is $$\min \Delta t \sum_{k=1}^{N_T} c(x_k, y_k, u_k) \quad (29)$$

$$\text{s.t.} \quad \frac{x_k - x_{k-1}}{\Delta t} = f^{diff}(x_k, y_k, u_k, d_k) \forall\, k = 1, \ldots, N_T$$

$$0 = f^{alg}(x_k, y_k, u_k, d_k) \forall\, k = 1, \ldots, N_T$$

$$(x_0, y_0) = (\hat{x}, \hat{y})$$

$$g(x_k, y_k, u_k, p) \leq 0 \} \forall\, k = 1, \ldots, N_T$$

$$h_i(y_k) \leq \mu_{i,k} \forall\, i = 1, \ldots, nh$$

$$\underline{x}_k \leq x_k \leq \overline{x}_k$$

$$\underline{y}_k \leq y_k \leq \overline{y}_k$$

$$\underline{u}_k \leq u_k \leq \overline{u}_k$$

As shown in FIG. 7, the relaxed version of the problem given in Eq. (29) is solved, and parameter $\mu_{i,k}$>0 is further reduced only if the complementarity conditions are violated by more than a threshold and the procedure is repeated.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for operating a set of heating, ventilation and air-conditioning (HVAC) units, comprising:
   optimizing jointly operations of the set of HVAC units subject to constraints to determine time instants of switching each HVAC unit ON and OFF,
   wherein the operation of switching ON each HVAC unit at each time instant is represented by a continuous function and a set of constraints for switching ON, such that the continuous function for switching ON is a deviation of a current time instant from the time instant of switching ON, and the set of the constraints include a difference of multipliers that are equal to the continuous function, and complementarity constraints between the multiplier variables and a state variable modeling of the switching ON for each HVAC unit;

wherein the operation of switching OFF of each HVAC unit at each time instant is represented by a continuous function and a set of constraints for switching OFF, such that the continuous function for switching OFF is a deviation of a current time instant from the time instant of switching OFF, and the set of constraints include a difference of multipliers that are equal to the continuous function, and complementarity constraints between multiplier variables and a state variable modeling of the switching OFF for each HVAC unit; and controlling each HVAC unit according to the corresponding times of switching, wherein the steps are performed in a processor.

2. The method of claim 1, wherein the complementarity constraint defines that the operation of HVAC unit includes one switching from OFF to ON state and one switching from ON to OFF state within a period of time.

3. The method of claim 2, wherein the period of time is twenty four hours.

4. The method of claim 1, wherein the set of HVAC units are configured to operate within a building, further comprising:

modeling the building as a network of nodes connected by edges to produce a model of the building, wherein the nodes represent rooms and the edges represent walls between the rooms;

determining, using the model of the building, a model for operating the set of HVAC units including differential equations of dynamics of one or combination of temperatures and humidity in the rooms of the building; and optimizing the operation of the set of HVAC units according to the model of the operation, wherein parameters of optimization include one or combination of a comfort of occupants in the building and the energy consumption of the set of HVAC units.

5. The method of claim 4, further comprising:

determining the model for the operation of the HVAC system for a period of time using one or combination of a weather forecast for the period of time, a heat load forecast for each HVAC unit for the period of time, an occupancy heat load forecast for each room for the period of time, and comfort requirements for each room for the period of time.

6. The method of claim 1, further comprising:

modeling the ON and OFF operations of the HVAC units using the complementarity constraints;

formulating an optimal control problem jointly optimizing the ON and OFF operations of the set of HVAC units;

discretizing the optimal control problem using an integration technique to produce a finite dimensional optimization problem; and solving iteratively the finite dimensional optimization problem using a sparse linear algebra until convergence.

7. The method of claim 1, wherein the continuous function includes $-(t-\tau_1)-\lambda_1(t)+v_1(t)=0,$ wherein $\tau_1$ is a time to switch the HVAC unit ON, t is defined as the current time instant, and $\lambda_1(t)$, $v_1(t)$ are multipliers for lower and upper bound constraints, wherein the complementarity constraint for the HVAC unit includes $z_1(t) \geq 0 \perp \lambda_1(t) \geq 0$ $z_1(t) \leq 1 \perp v_1(t) \geq 0$ wherein a variable $z_1(t)$ models a state of the HVAC unit, the variable $z_1(t)$ is one after the HVAC unit is ON and zero before the HVAC unit is ON, wherein the continuous function includes $-(t-\tau_2)-\lambda_2(t)+v_2(t)=0,$ wherein $\tau_2$ is a time to switch the HVAC unit OFF, $\lambda_2(t)$, $v_2(t)$ are Lagrange multipliers for the lower and the upper bound constraints, wherein the complementarity constraint for the HVAC unit includes $z_2(t) \geq 0 \perp \lambda_2(t) \geq 0$ $z_2(t) \leq 1 \perp v_2(t) \geq 0,$ wherein a variable $z_2(t)$ models the state of the HVAC unit and equals one after the HVAC unit is switched OFF at the switch OFF time and equals zero before the switch OFF time, wherein the continuous function includes $z(t)=z_1(t)-z_2(t),$ wherein z(t) is a variable that equals one when the state of the HVAC unit is ON and equals zero when the state of the HVAC unit is OFF.

8. The method of claim 7, wherein the complementarity constraint includes $z_{1,i}(t) \geq z_{2,i}(t),$ wherein a variable $z_{1,i}(t)$ models a state of an i-th HVAC unit and equals one after the i-th HVAC unit is switched ON at the switch ON time of the i-th HVAC unit and equals zero before the switch ON time of the i-th HVAC unit, and wherein a variable $z_{2,i}(t)$ models the state of an i-th HVAC unit and equals one after the i-th HVAC unit is switched OFF at the switch OFF time of the i-th HVAC unit and equals zero before the switch OFF time of the i-th HVAC unit.

9. The method of claim 8, wherein the complementarity constraint includes $$\left. \begin{array}{l} \tau_{1,i} \leq \tau_{1,i+1} \\ \tau_{2,i} \leq \tau_{2,i+1} \end{array} \right\} \forall i = 1, \ldots, Nh-1,$$

wherein, $\tau_{1,i}$ is the switch ON time of the i-th HVAC unit, and $\tau_{2,i}$ is the switch OFF time of the i-th HVAC unit and Nh is the number of HVAC units.

10. The method of claim 1, wherein the continuous function includes $-(t-\tau_1)(\tau_2-t)-\lambda(t)+v(t)=0,$ wherein $\tau_1$ is a switch ON time of switching a HVAC unit ON, t is defined as the current time instant $\tau_2$ is a switch OFF time of switching the HVAC unit OFF, $\lambda(t)$, v(t) are Lagrange multipliers for lower and upper bound constraints, wherein the complementarity constraint for each HVAC unit includes $z(t) \geq 0 \perp \lambda(t) \geq 0$ $z(t) \leq 1 \perp v(t) \geq 0,$ wherein z(t) is a variable that equals one when the state of the HVAC unit is ON and equals zero when the state of the HVAC unit is OFF.

11. The method of claim 10, wherein the complementarity constraint includes $$\left.\begin{array}{l}\tau_{1,i} \le \tau_{1,i+1}\\ \tau_{2,i} \ge \tau_{2,i+1}\end{array}\right\} \forall\, i=1,\ldots,Nh-1,$$

wherein, $\tau_{1,i}$ is the switch ON time of an i-th HVAC unit, and $\tau_{2,i}$ is the switch OFF time of the i-th HVAC unit and Nh is the number of HVAC units.

12. The method of claim 1, further comprising:
optimizing the operations of the HVAC units using iterative relaxation of the complementarity constraint.

13. The method of claim 12, wherein the complementarity constraint is relaxed according to a relaxation parameter, and wherein, for each iteration of the iterative relaxation, the relaxation parameter is reduced monotonically.

14. The method of claim 12, wherein a relaxation parameter is modified only when the complementarity constraint for a current value of the relaxation parameter is violated.

15. The method of claim 12, further comprising:
optimizing the operations of the HVAC units using an interior point method.

16. The method of claim 12, further comprising:
reformulating the complementarity constraint as an inequality, such that a product of the state variable modeling of the switching ON for each HVAC unit and the multiplier corresponding to its lower bound of zero or a product of a difference of the state variable modeling of the switching ON for each HVAC unit from one and the multiplier corresponding to the upper bound of one is less than a relaxation parameter; and
determining the times of the switching iteratively based on the inequality, wherein a value of the relaxation parameter is adaptively reduced for subsequent iterations;
reformulating the complementarity constraint as an inequality, such that a product of the state variable modeling of the switching OFF for each HVAC unit and the multiplier corresponding to its lower bound of zero or a product of a difference of the state variable modeling of the switching OFF for each HVAC unit from one and the multiplier corresponding to the upper bound of one is less than a relaxation parameter; and
determining the times of the switching iteratively based on the inequality, wherein a value of the relaxation parameter is adaptively reduced for subsequent iterations.

17. The method of claim 16, wherein the determining for a current iteration comprises:
determining the times of the switching based on values of the times of the switching determined during a previous iteration;
testing the inequality using values of the times of the switching of the current iteration; and
modifying the value of the relaxation parameter, if the inequality is violated.

18. The method of claim 17, wherein the optimizing uses an interior point method, wherein the relaxation parameter is proportional to a barrier parameter of the interior point method, and wherein the barrier parameter is monotonically reduced for each iteration.

19. The method of claim 16, further comprising:
determining the times of the switching iteratively using an interior point method based on a barrier problem.

20. A controller for operating a set of heating, ventilation and air-conditioning (HVAC) units according to corresponding times of switching, the controller comprising:
a processor for optimizing jointly operations of the set of HVAC units subject to constraints to determine time instants of switching each HVAC unit ON and OFF,
wherein the operation of switching ON each HVAC unit at each time instant is represented by a continuous function and a set of constraints for switching ON, wherein the continuous function for switching ON is a deviation of a current time instant from the time instant of switching ON, and the set of the constraints include a difference of multipliers that are equal to the continuous function, and complementarity constraints between the multiplier variables and a state variable modeling of the switching ON for each HVAC unit,
wherein the operation of switching OFF of each HVAC unit at each time instant is represented by a continuous function and a set of constraints for switching OFF, such that the continuous function for switching OFF is a deviation of a current time instant from the time instant of switching OFF, and the set of constraints include a difference of multipliers that are equal to the continuous function, and complementarity constraints between multiplier variables and a state variable modeling of the switching OFF for each HVAC unit and
controlling each HVAC unit according to the corresponding times of switching.

21. A method for operating a set of heating, ventilation and air-conditioning (HVAC) units, comprising:
optimizing jointly operations of the set of HVAC units subject to constraints to determine time instants of switching each HVAC unit ON and OFF,
wherein the operation of switching ON each HVAC unit at each time instant is represented by a continuous function and a set of constraints for switching ON, such that the continuous function for switching ON is a deviation of a current time instant from the time instant of switching ON, and the set of the constraints include a difference of multipliers that are equal to the continuous function, and complementarity constraints between the multiplier variables and a state variable modeling of the switching ON for each HVAC unit, such that the continuous function includes $-(t-\tau_1)-\lambda_1(t)=0,$ wherein $\tau_1$ is a time instant to switch the HVAC unit ON, t is defined as the current time instant, and $\lambda_1(t)$, $v_1(t)$ are multipliers for lower and upper bound constraints,
wherein the operation of switching OFF of each HVAC unit at each time instant is represented by a continuous function and a set of constraints for switching OFF, such that the continuous function for switching OFF is a deviation of a current time instant from the time instant of switching OFF, and the set of constraints include a difference of multipliers that are equal to the continuous function, and complementarity constraints between multiplier variables and a state variable modeling of the switching OFF for each HVAC unit, such that the continuous function includes $-(t-\tau_2)-\lambda_2(t)+v_2(t)=0,$ wherein $\tau_2$ is a time instant to switch the HVAC unit OFF, t is defined as the current time instant, and $\lambda_2(t)$, $v_2(t)$ are multipliers for lower and upper bound constraints; and controlling each HVAC unit according to the corresponding times of switching, wherein the steps are performed in a processor.

22. A system for operating a set of heating, ventilation and air-conditioning (HVAC) units, comprising:
- a processor is configured to optimize jointly operations of the set of HVAC units subject to constraints to determine time instants of switching each HVAC unit ON and OFF,
  wherein the operation of switching ON each HVAC unit at each time instant is represented by a continuous function and a set of constraints for switching ON, such that the continuous function for switching ON is a deviation of a current time instant from the time instant of switching ON, and the set of the constraints include a difference of multipliers that are equal to the continuous function, and complementarity constraints between the multiplier variables and a state variable modeling of the switching ON for each HVAC unit, such that the continuous function includes $-(t-\tau_1)-\lambda_1(t)=0,$ wherein $\tau_1$ is a time instant to switch the HVAC unit ON, t is defined as the current time instant, and $\lambda_1(t)$, $v_1(t)$ are multipliers for lower and upper bound constraints,
  wherein the operation of switching OFF of each HVAC unit at each time instant is represented by a continuous function and a set of constraints for switching OFF, such that the continuous function for switching OFF is a deviation of a current time instant from the time instant of switching OFF, and the set of constraints include a difference of multipliers that are equal to the continuous function, and complementarity constraints between multiplier variables and a state variable modeling of the switching OFF for each HVAC unit, such that the continuous function includes $-(t-\tau_2)-\lambda_2(t)=v_2(t)=0,$ wherein $\tau_2$ is a time instant to switch the HVAC unit OFF, t is defined as the current time instant, and $\lambda_2(t)$, $v_2(t)$ are multipliers for lower and upper bound constraints; and
- control each HVAC unit according to the corresponding times of switching.

* * * * *